Dec. 1, 1931.    W. H. BRYANT    1,834,678
SAFETY LOCK OR COUPLING
Filed Feb. 20, 1931
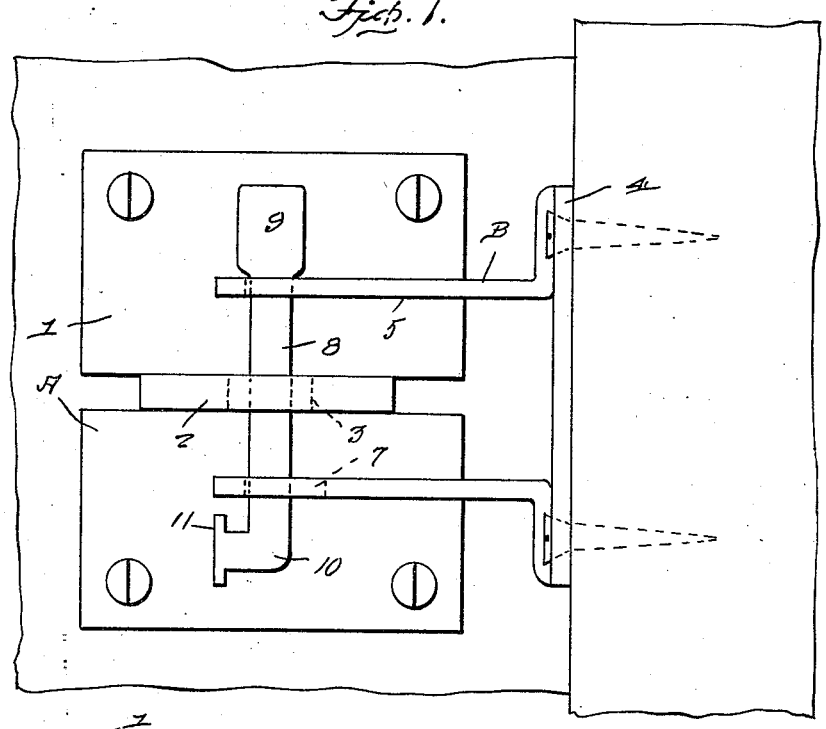
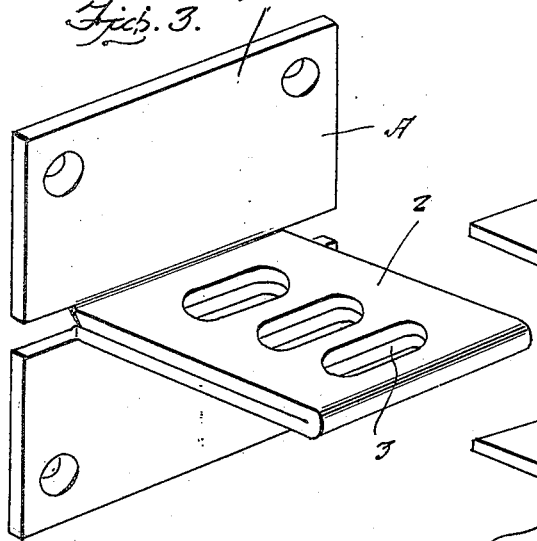
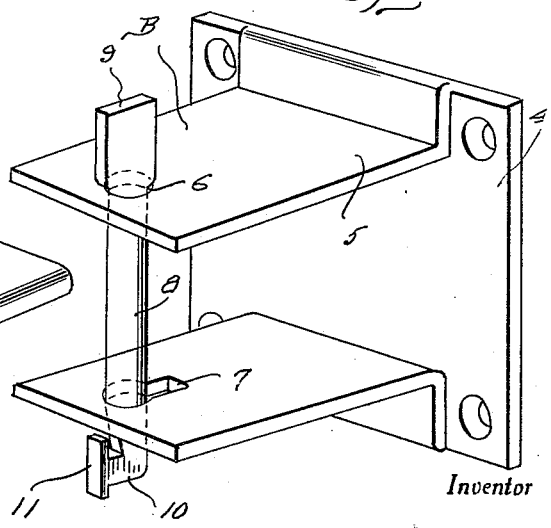
Inventor
W. H. Bryant
By *Clarence A. O'Brien*
Attorney Patented Dec. 1, 1931

1,834,678

UNITED STATES PATENT OFFICE

WEAVER H. BRYANT, OF NORTH LITTLE ROCK, ARKANSAS, ASSIGNOR OF ONE-HALF TO L. G. MOORE AND L. F. MOORE, BOTH OF NORTH LITTLE ROCK, ARKANSAS

SAFETY LOCK OR COUPLING

Application filed February 20, 1931. Serial No. 517,343.

This invention relates to a safety lock or coupling which may be used for holding doors of refrigerator cars open while the cars are being switched or moved, or as a coupling for trailers on trucks, tractors and the like, the general object of the invention being to provide a male member and a female member with a locking means or pin for connecting the two members together, one of the members having a plurality of slots therein any one of which is adapted to receive the pin, so that the parts can be adjustably connected together.

This invention also consists in certain other features of construction and in the combination and arrangement of the several parts to be hereinafter fully described, illustrated in the accompanying drawings, and specifically pointed out in the appended claim.

In describing the invention in detail, reference will be had to the accompanying drawings wherein like characters denote like or corresponding parts throughout the several views, and in which:—

Figure 1 is an elevation showing the device used as a lock for a freight car door.

Fig. 2 is a view of one of the members.

Fig. 3 is a view of the other member.

In these views, the male member is shown at A and the female member at B. The male member comprises a pair of plates 1 connected together by a right angularly extending member 2 which is formed with a number of elongated slots 3. This member 2 is preferably formed integrally with the two plates 1, and then bent upon itself to form two thicknesses of metal, the end of one thickness being connected with one plate and the end of the other thickness to the other plate, as clearly shown in Fig. 3. This male member is adapted to fasten to one of the parts which are to be connected together by the device.

The female member B consists of a plate 4 having the spaced outwardly extending plate-like parts 5 at its side edges with one of the parts 5 having an opening 6 therein and the other having a keyhole shaped slot 7 therein. A pin 8 is passed through the opening 6 and has a flat part 9 at one end thereof, forming a shoulder for resting on the top of the member 5 which carries the opening 6, and the other end of the pin is flattened and bent at right angles as shown at 10 with a head 11 formed on the extremity of the bent part.

Thus by turning the pin 8 by grasping the flattened part 9 between the fingers so as to place the head 11 in alinement with the flat part of the keyhole-shaped opening 7, the pin can be raised as the bent end 10 will pass through the keyhole shaped opening. Then the part 2 of the member A can be placed between the two plate-like members 5 of the part B and the pin lowered to pass through one of the slots 3, and the keyhole shaped opening 7, after which the pin is turned to lock it in this position. Thus the two parts are fastened together by the pin and by passing the pin through the desired opening, or slot 3 in the part 2, the two members to which the parts A and B are connected can be adjusted relatively to each other.

For instance, if the device is used as a lock for a door as shown in Fig. 1, the door can be held open to different extents by placing the pin in different slots in the member A. This makes the device desirable as a latch for doors of refrigerator cars where the Interstate Commerce Commission requires that the doors be held open while the cars are being moved or switched.

As before stated, the device can also be used as a coupling for trailers on trucks, tractors and the like, and for other purposes. The flattened end 9 and the bent end 10 of the pin 8 prevents the pin from being entirely removed from the upper plate 5, so that there is no danger of the pin being lost.

It is thought from the foregoing description that the advantages and novel features of the invention will be readily apparent.

It is to be understood that changes may be made in the construction and in the combination and arrangement of the several parts, provided that such changes fall within the scope of the appended claim.

Having thus described my invention, what I claim as new is:—

A lock of the class described comprising a plate having a reduced central portion which is looped upon itself to form a projection of double thickness and which extends at right angles to the outer parts of the plate, and said projection having a number of elongated slots therein, a second plate, a pair of spaced flanges thereon between which the projection of the other plate is adapted to be passed, the flanges being bent inwardly into contact with the second plate and then bent to extend outwardly at right angles from the plate one of the flanges having an opening therein and the other having a key-hole shaped opening therein, and a locking pin of circular shape in cross section adapted to be passed through said openings and one of the slots in the other plate to fasten the two parts together, one end of the key having an end bent at right angles and passing through the key-hole shaped opening the other end of the key being flattened to prevent its passing through the opening in the adjacent flange.

In testimony whereof I affix my signature.

WEAVER H. BRYANT.